US009746625B2

(12) United States Patent
Zhao et al.

(10) Patent No.: US 9,746,625 B2
(45) Date of Patent: Aug. 29, 2017

(54) OPTICAL MODULE

(71) Applicants: Hisense Broadband MultiMedia Technologies Co., Ltd., Qingdao, Shandong (CN); Hisense USA Corp., Suwanee, GA (US); Hisense International Co., Ltd., Qingdao, Shandong (CN)

(72) Inventors: Wei Zhao, Shandong (CN); Wei Cui, Shandong (CN); Hongchao Pan, Shandong (CN); Yinlong Liu, Shandong (CN); Lin Yu, Shandong (CN)

(73) Assignees: HISENSE BROADBAND MULTIMEDIA TECHNOLOGIES CO., LTD., Qingdao, Shandong (CN); HISENSE USA, CORP., Suwanee, GA (US); HISENSE INTERNATIONAL CO., LTD., Qingdao, Shandong (CN)

( * ) Notice: Subject to any disclaimer, the term of this patent is extended or adjusted under 35 U.S.C. 154(b) by 0 days.

(21) Appl. No.: 15/222,550

(22) Filed: Jul. 28, 2016

(65) Prior Publication Data

US 2017/0160500 A1    Jun. 8, 2017

(30) Foreign Application Priority Data

Dec. 4, 2015   (CN) .......................... 2015 1 0890288
Dec. 8, 2015   (CN) .......................... 2015 1 0893054

(51) Int. Cl.
*G02B 6/28* (2006.01)
*G02B 6/42* (2006.01)
*G02B 6/38* (2006.01)

(52) U.S. Cl.
CPC ......... *G02B 6/4257* (2013.01); *G02B 6/3825* (2013.01); *G02B 6/428* (2013.01);
(Continued)

(58) Field of Classification Search
None
See application file for complete search history.

(56) References Cited

U.S. PATENT DOCUMENTS

| 6,830,383 | B2 | 12/2004 | Huang |
| 2002/0102075 | A1 | 8/2002 | Nakura et al. |
| 2008/0145006 | A1* | 6/2008 | Ice .................. G02B 6/4201 385/93 |

FOREIGN PATENT DOCUMENTS

| CN | 101287353 A | 10/2008 |
| CN | 101938061 A | 1/2011 |

(Continued)

OTHER PUBLICATIONS

First Office Action Chinese Patent Application No. 201510893054.X dated Sep. 5, 2016 with English translation.
(Continued)

*Primary Examiner* — Jerry Rahll
(74) *Attorney, Agent, or Firm* — McDermott Will & Emery LLP

(57) ABSTRACT

The embodiments of the present disclosure disclose an optical module, comprising a housing, an adaptor and an optical sub-module being provided inside the housing, the adaptor being fixed with the optical sub-module, wherein an optical port component is also provided inside the housing, the optical port component is located at one side of the adaptor far away from the optical sub-module, and an opening is formed at one end of the optical port component far away from the adaptor; a through hole for the optical port component is formed on an end surface of the optical port component close to the adaptor, the adaptor can pass through the through hole for the optical port component to be fixed with the optical port component, and an optical fiber can be inserted into the adaptor from the opening.

18 Claims, 5 Drawing Sheets

(52) U.S. Cl.
CPC ......... *G02B 6/4278* (2013.01); *G02B 6/4284* (2013.01); *G02B 6/4292* (2013.01)

(56) References Cited

FOREIGN PATENT DOCUMENTS

| | | |
|---|---|---|
| CN | 102520494 A | 6/2012 |
| CN | 205176335 U | 4/2016 |

OTHER PUBLICATIONS

Search Report Chinese Patent Application No. 201510893054.x dated Aug. 25, 2016 with English translation.

\* cited by examiner

OPTICAL MODULE

CROSS-REFERENCE TO RELATED APPLICATIONS

The subject application claims priority to Chinese Patent Application No. 201510893054.X filed Dec. 8, 2015, and Chinese Patent Application No. 201510890288.9 filed Dec. 4, 2015. The subject matter of each is incorporated herein by reference in entirety.

FIELD

The present disclosure relates to the technical field of optical fiber communication, and in particular to an optical module.

BACKGROUND

In optical fiber communication technologies, optical signals, as carriers for information, perform high-speed, long-time and reliable information transmission. The function of optical modules is optical-to-electric conversion. That is, a sending terminal converts an electric signal to an optical signal; and after transferring the optical signal by an optical fiber, a receiving terminal converts the optical signal to the electric signal again.

SUMMARY

Some embodiments of the present disclosure provide an optical module, including a housing, an adaptor and an optical sub-module being provided inside the housing, the adaptor being fixed with the optical sub-module, wherein an optical port component is also provided inside the housing, the optical port component is located at one side of the adaptor far away from the optical sub-module, and an opening is formed at one end of the optical port component far away from the adaptor; a through hole for the optical port component is formed on an end surface of the optical port component close to the adaptor, the adaptor can pass through the through hole for the optical port component to be fixed with the optical port component, and an optical fiber can be inserted into the adaptor from the opening.

BRIEF DESCRIPTION OF THE DRAWINGS

In order to describe technical solutions in some embodiments of the present disclosure or in the prior art more clearly, the accompanying drawings to be used in the description of the embodiments or the prior art will be introduced briefly below. Obviously, the accompanying drawings in the description below are merely some embodiments of the present disclosure. For a person of ordinary skill in the art, other accompanying drawings can be obtained according to these accompanying drawings without paying any creative effort.

DETAILED DESCRIPTION

The accompanying drawings in the embodiments of the present disclosure are incorporated to describe the technical solutions in some embodiments of the present disclosure below. Obviously, the embodiments described are merely some but not all embodiments of the present disclosure. On the basis of the embodiments of the present disclosure, all other embodiments obtained by a person of ordinary skill in the art without paying any creative effort shall fall into the protection scope of the present disclosure.

In the description of the present disclosure, it should be noted that, the orientation or location relation indicated by terms such as "center", "upper", "lower", "front", "back", "left", "right", "vertical", "horizontal", "top", "bottom", "internal", "external" and the like is an orientation or location relation based on what is shown in the accompanying drawings, and is merely used for conveniently describing the present disclosure and simplifying the description, instead of indicating or implying that the involved devices or elements must have a specific orientation, and must be constructed and operated in a specific orientation. Therefore, these terms shall not be regarded as limitations to the present disclosure.

Terms such as "the first" and "the second" are merely used for description, and cannot be regarded as indication or implication for relative importance or indication for the number of the indicated technical features. In this way, features defined with "the first" and "the second" can explicitly or implicitly indicate that one or more of the features are included.

In the description of the present disclosure, it should be noted that, unless otherwise explicitly specified and defined, terms such as "mounted", "linked", "connected" should be understood in a general sense. For example, when two parts are connected, they can be fixedly connected, or detachably connected, or integrally connected; and when two parts are linked, they can be directly linked, can be indirectly linked by an intermediate medium, and can be communicated in the interiors thereof. For a person of ordinary skill in the art, the specific meaning of these terms can be understood according to specific situations.

Figure 1:
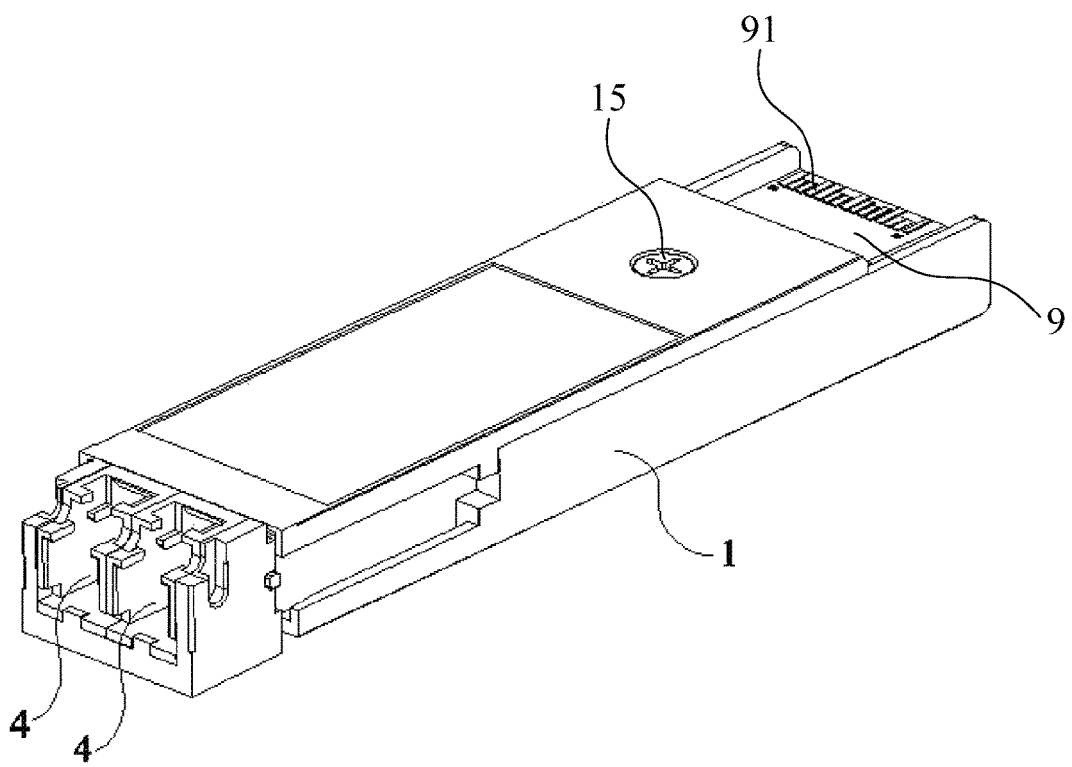
FIG. 1 is a stereogram of an optical module according to some embodiments of the present disclosure.
Figure 2:
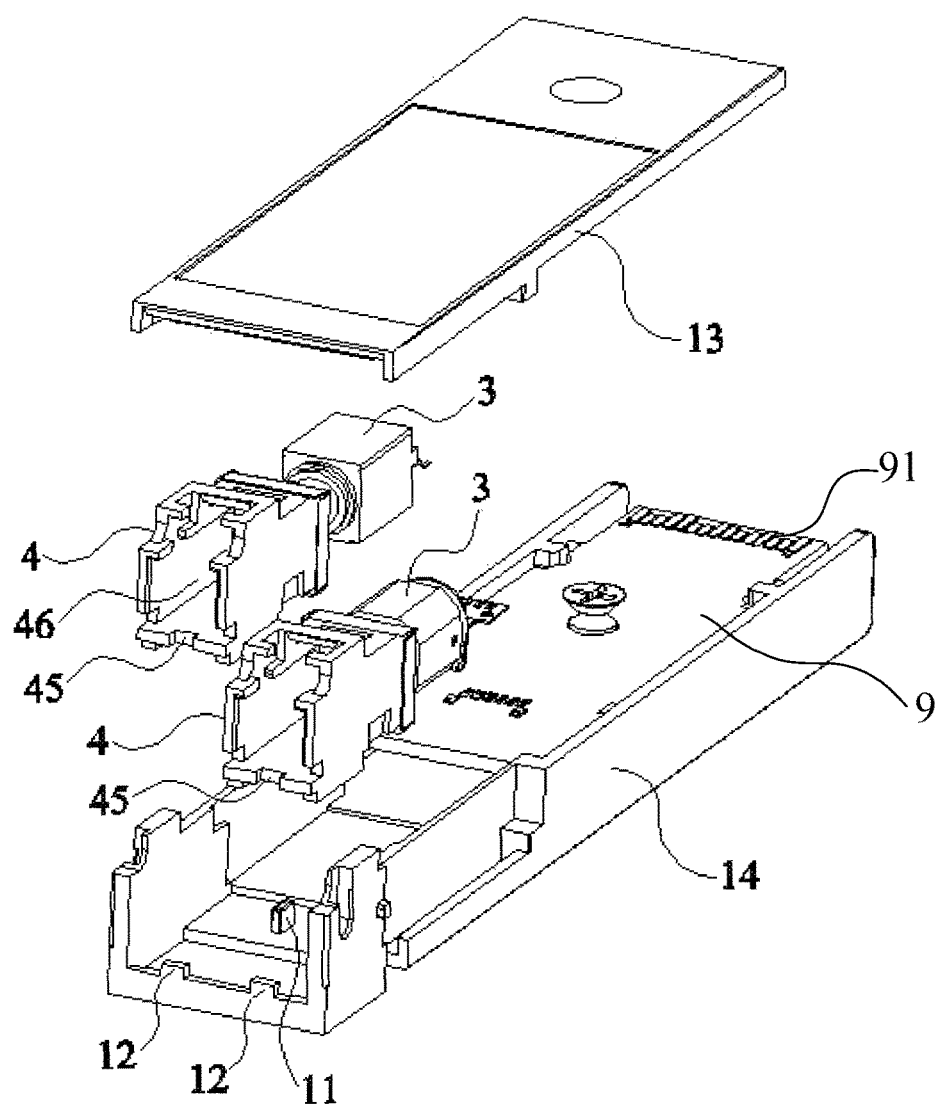
FIG. 2 is an exploded view of FIG. 1.
Figure 3:
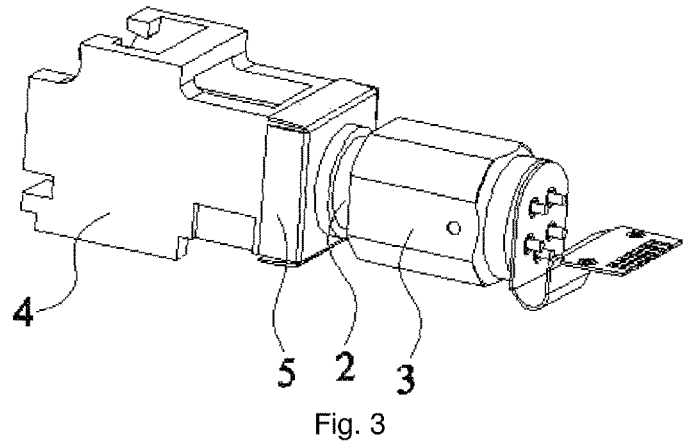
FIG. 3 is a schematic view of connection between an optical port component and an optical sub-module in the optical module according to some embodiments of the present disclosure.

FIG. 1 to FIG. 3 show an optical module according to some embodiments of the present disclosure. The optical module includes a housing 1, an adaptor 2 and an optical sub-module 3 being provided inside the housing 1, the adaptor 2 being fixed with the optical sub-module 3, wherein an optical port component 4 is also provided inside the housing 1, the optical port component 4 is located at one side of the adaptor 2 far away from the optical sub-module 3, and an opening 46 is formed at one end of the optical port component 4 far away from the adaptor 2; and a through hole 41 for the optical port component, i.e., a through hole formed on the optical port component, is formed on an end surface of the optical port component 4 close to the adaptor 2, the adaptor 2 can pass through the through hole 41 for the optical port component to be fixed with the optical port component 4, and an optical fiber can be inserted into the adaptor 2 from the opening 46.

The optical port component 4 is an interface element for connecting an optical fiber. The optical port component 4 is generally made of metal, and of course, can be made of other kinds of material.

When in use of the optical module according to some embodiments of the present disclosure, an optical fiber can be inserted into the adaptor 2 from the opening 46 of the optical port component 4 to allow an optical signal of the optical fiber to enter the optical sub-module 3 from the adaptor 2 then to be converted into an electric signal, or to allow an optical signal inside the optical sub-module 3 to enter the optical fiber from the adaptor 2 and to be transmitted inside the optical fiber. Since the adaptor 2 can pass through the through hole 41 for the optical port component to be fixed with the optical port component 4, when the housing 1 shakes, the adaptor 2 and the optical port component 4 can collectively move with respect to the housing 1; or both of the adaptor 2 and the optical port component 4 remain static with respect to the housing 1. That is, there is no relative movement between the adaptor 2 and the optical port component 4, thus ensuring the coupling efficiency of the optical fiber.

The optical port component 4 can be integrated with the housing 1, or detachably connected with the housing 1. When the optical port component 4 and the housing 1 are integrated, due to obstruction from the housing 1, there is a relatively small operating space around the optical port component 4, thus causing inconvenience when the adaptor 2 is mounted. When the optical port component 4 is detachably connected with the housing 1, the adaptor 2 can be fixed with the optical port component 4 before connecting the optical port component 4 and the housing 1. In this case, since there is no obstacle around the optical port component 4, the operating space is relatively large, thus bringing convenience for operation when the adaptor 2 is mounted. In this way, the optical port component 4 is detachably connected to the housing 1.

Figure 4:
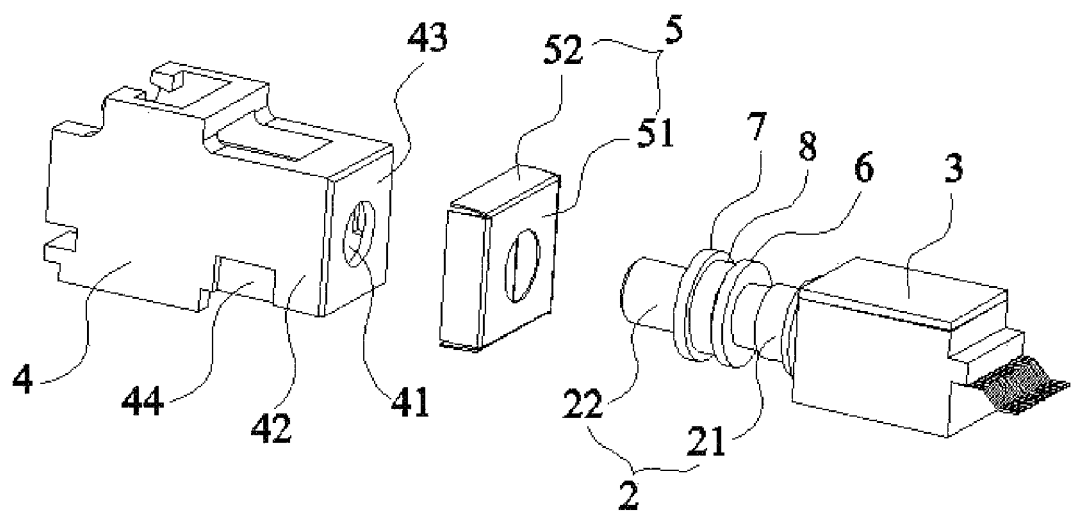
FIG. 4 is an exploded view of FIG. 3.

There is a plurality of ways for fixing the optical port component 4 and the adaptor 2. For example, internal threads can be provided on an internal surface of the through hole 41 for the optical port component, and external threads can be provided on an external surface of the adaptor 2, so that the optical port component 4 is connected to the adaptor 2 by threads. Or, an adhesive can also be provided between an external surface of the adaptor 2 and an internal surface of the through hole 41 for the optical port component, so that the optical port component 4 is bonded with the adaptor 2 by the adhesive. Of course, the adaptor 2 can be caused to be in interference fit with the through hole 41 for the optical port component, so that the optical port component 4 is connected to the adaptor 2. In some embodiments of the present disclosure, the optical port component 4 is fixed with the adaptor 2 by a connecting member 5. As shown in FIG. 3 and FIG. 4, a first limiting protrusion 6 and a second limiting protrusion 7 are sleeved on the adaptor 2, and both of the first limiting protrusion 6 and the second limiting protrusion 7 are fixed with the adaptor 2; a groove 8 is formed between the first limiting protrusion 6 and the second limiting protrusion 7; a connecting member 5 is also sleeved on the adaptor 2 and clamped in the groove 8; and when the adaptor 2 passes through the through hole 41 for the optical port component, the connecting member 5 is fixed with the optical port component 4, so that the optical port component 4 is fixed with the adaptor 2 by the connecting member 5.

With reference to FIG. 4, the connecting member 5 includes a base plate 51 with hole and side plates 52 fixed on the edges of the base plate 51 with hole. The adaptor 2 includes a first segment 21 on which the first limiting protrusion 6 is provided and a second segment 22 on which the second limiting protrusion 7 is provided. The first limiting protrusion 6 can be integrated with the first segment 21, or clamped on the first segment 21; and the second limiting protrusion 7 can also be integrated with the second segment 22, or can also be clamped on the second segment 22. The first segment 22 is fixed with the optical sub-module 3, and the first segment 21 is connected to the second segment 22 so that the groove 8 is formed between the first limiting protrusion 6 and the second limiting protrusion 7, and the base plate 51 with hole is clamped in the groove 8. Now, the connection between the connecting member 5 and the adaptor 2 is completed. The first segment 21 and the second segment 22 can be welded integrally, and can also be connected by threads for the convenience of detaching. The second segment 22 can pass through the through hole 41 for the optical port component. When the second segment 22 passes through the through hole 41 for the optical port component, the side plates 51 of the connecting member 5 are fixed with the sides 42 of the optical port component 4. Now, the connection between the connecting member 5 and the optical port component 4 is completed, thus the optical port component 4 is fixed with the adaptor 2 by the connecting member 5.

The side plate 52 of the connecting member 5 can be fixed with the side 42 of the optical port component 4 by means of welding, and can also be fixed by means of bonding by an adhesive. Of course, a threaded hole can also be provided on the side 42 of the optical port component 4, and an optical hole is provided on the side plate 52 of the connecting member 5 at a position corresponding to the threaded hole. Upon passing through the optical hole, a screw is connected with the threaded hole in coordination, so that the side plate 52 of the connecting member 5 is fixed with the side 42 of the optical port component 4. When compared with welding and connecting by a screw, bonding is simple and convenient in operation and can decrease the process difficulty and increase the efficiency and meanwhile reduce the cost. In this way, the side plate 52 of the connecting member 5 and the side 42 of the optical port component 4 in this embodiment can be fixed by means of bonding by an adhesive.

The base plate 51 with hole of the connecting member 5 has a same size as that of an end surface 43 of the optical port component 4 close to the adaptor 2. Of course, the size can be greater or less than that of the end surface 43. In order to conveniently fix the side plate 52 of the connecting member 5 with the side 42 of the optical port component 4, in this embodiment, the base plate 51 with hole of the connecting member 5 can have a same size as that of the end surface 43 of the optical port component 4 close to the adaptor 2. In this way, when the base plate 51 with hole is close to the end surface 43, the side plates 52 can directly face the sides 42 of the optical port component 4, and a distance between the side plates 52 and the sides 42 of the optical port component 4 can also be shortened, thus conveniently fixing the side plates 52 of the connecting member 5 and the sides 42 of the optical port component 4.

There is a plurality of ways for connecting the optical port component 4 with the housing 1. For example, the optical port component 4 can be connected to the housing 1 by screw(s), or can also be clamped inside the housing 1. When compared with connecting by screw, the connection way of clamping the optical port component 4 inside the housing 1 is more convenient to assemble and detach them; besides, no parts will be separated from the housing 1 after being detached, and fewer parts will be lost. In this way, the optical port component 4 in this embodiment can be clamped inside the housing 1.

With reference to FIG. 2, the housing 1 in some embodiments of the present disclosure includes a plate-like upper housing 13 and a U-shaped housing 14. The upper housing 13 can cover the lower housing 14. In this way, when the optical module is assembled, all of the adaptor 2, the optical sub-module 3, the optical port component 4 and the circuit board and other components can be provided inside the lower housing 14 first, and then the upper housing 13 is covered thereon. In this way, obstruction from the upper housing 13 to the components is avoided, thus making the assembly process convenient.

A first groove is provided on a bottom surface of the optical port component 4, a third limiting protrusion is provided on a bottom surface of the housing 1, and the first groove matches with the third limiting protrusion. By clamping the third limiting protrusion into the first groove, the optical port component 4 can be prevented from moving in the insertion or plugging-out direction of the optical fiber and from moving right and left in a direction perpendicular to the insertion or plugging-out direction of the optical fiber. The top surface and the bottom surface of the housing 1 can prevent the optical port component 4 from moving up and down in the direction perpendicular to the insertion or plugging-out direction of the optical fiber. In this way, the optical port component 4 is clamped inside the housing 1.

A second groove is provided at one end in the bottom portion of the optical port component 4 far away from the adaptor 2, and a fourth limiting protrusion is provided on the bottom surface of the housing 1 and clamped inside the second groove. In this way, the fourth limiting protrusion is matched with the second groove in terms of shape, and can function as a mounting guide during the assembly, thus making the assembly convenient.

Figure 5:
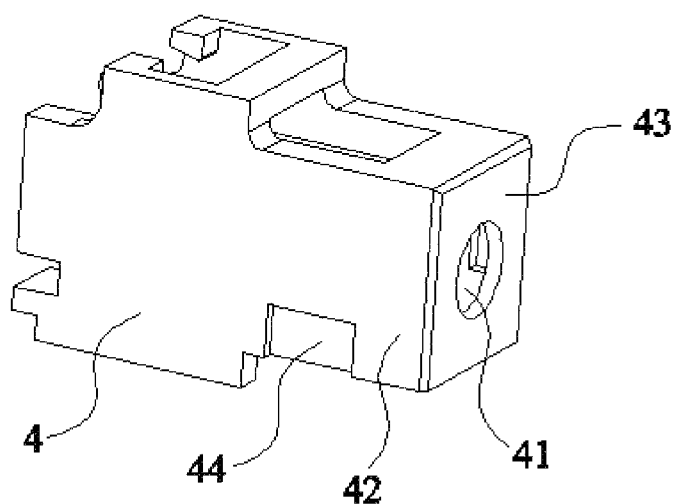
FIG. 5 is a schematic structure diagram of the optical port component in the optical module according to some embodiments of the present disclosure.

With reference to FIG. 1, FIG. 2 and FIG. 5, the optical module includes two optical port components 4 arranged in parallel. In some embodiments of the present disclosure, the first grooves 44 are provided on both sides 42, which are close to each other, of the two optical port components 4, and the two first grooves 44 are opposite in position. The third limiting protrusion 11 is provided on the bottom surface of the housing 1. Both of the two first grooves 44 are clamped with the third limiting protrusion 11. By clamping the third limiting protrusion 11 into the two first grooves 44, the two optical port components 4 are limited in order to prevent the two optical port components 4 from moving in the insertion or plugging-out direction of the optical fiber, and prevent the optical port component 4 at the left side from moving to the right side and the optical port component 4 at the right side from moving to the left side. The second grooves 45 are provided on one end in the bottom surface of the two optical port components 4 far away from the adaptor 2. Two fourth limiting protrusions 12 are provided on the bottom surface of the housing 1 and clamped inside the two second grooves 45 respectively. By clamping the fourth limiting protrusions 12 into the second grooves 45, the two optical port components 4 are limited in order to prevent the two optical port components 4 from moving right and left in the direction perpendicular to the insertion or plugging-out direction of the optical fiber and prevent the two optical port components 4 from moving in the insertion or plugging-out direction of the optical fiber. The top surface and the bottom surface of the housing 1 can prevent the two optical port components 4 from moving up and down in the direction perpendicular to the insertion or plugging-out direction of the optical fiber. In this way, the optical port components 4 are clamped within the housing 1.

In addition, the two first grooves 44 are clamped with the same third limiting protrusion 11, thus reducing the number of the third limiting protrusions 11 and decreasing the process difficulty.

In some embodiments of the present disclosure, grooves can also be provided on the bottom surfaces of the two optical port components 4, respectively, and fixture blocks are provided on the bottom surface of the housing 1 at positions corresponding to the two grooves. By clamping the grooves with the fixture blocks, the optical port component 4 can be prevented from moving in the insertion or plugging-out direction of the optical fiber and from moving right and left in the direction perpendicular to the insertion or plugging-out direction of the optical fiber. The top surface and the bottom surface of the housing 1 can prevent the optical port component 4 from moving up and down in the direction perpendicular to the insertion or plugging-out direction of the optical fiber. In this way, both of the two optical port components 4 are clamped inside the housing 1.

In some embodiments of the present disclosure, the second grooves 45 can be provided at one end in the bottom portion of the two optical port components 4 far away from the adaptor 2 and at one end thereof close to the adaptor 2. The fourth limiting protrusions 12 are provided on the bottom surface of the housing 1 at positions corresponding to the second grooves 45 and clamped inside the second grooves 45. By clamping the fourth limiting protrusions 12 at two ends of the optical port component 4 into the second grooves 45, the two optical port components 4 are limited in order to prevent the two optical port components 4 from moving in the insertion or plugging-out direction of the optical fiber, and prevent the two optical port components 4 from moving right and left in the direction perpendicular to the insertion or plugging-out direction of the optical fiber. The top surface and the bottom surface of the housing 1 can prevent the two optical port components 4 from moving up and down in the direction perpendicular to the insertion or plugging-out direction of the optical fiber. In this way, both of the two optical port components 4 can also be clamped inside the housing 1.

In order to weaken the shaking of the optical sub-module 3 inside the housing 1, with reference to the FIG. 3 and FIG. 4, the optical sub-module 3 in some embodiments of the present disclosure is a cuboid or a prism. Sides of both of the cuboid and the prism are formed by splicing a plurality of planes together. When the optical sub-module 3 is assembled, at least one side of the cuboid or the prism can be attached to an inner wall of the housing 1 so as to weaken the shaking of the optical sub-module 3 inside the housing 1.

The connecting member 5 can be made of metal which can promise the connection strength between the optical port component 4 and the adaptor 2, for example, stainless steel.

In some embodiments of the present disclosure, in the provided optical module, the housing 1 can include an upper housing 13 and a lower housing 14. As shown in FIG. 1, FIG. 2, FIG. 6 and FIG. 7, a circuit board 9 located at one side of the optical sub-module 3 far away from the adaptor 2 and electrically connected to the optical sub-module 3 is also provided inside the housing 1; connecting fingers 91 are provided on the circuit board 9 to form an electric interface port 100; and at least one conductor 110 is provided between the optical port component 4 and the electric interface port 100, and the conductor 100 extends from the upper housing 13 to the lower housing 14.

In the optical module, one end on which the connecting fingers 91 are provided forms the electric interface port 100, and one end on which the optical port interface component 4 is provided forms the optical interface port 400.

There is no conductor 110 in an existing optical module, and when such an optical module operates, the connecting fingers 91 generate electromagnetic radiation leaking from the optical interface port 400 via the gap between the circuit board 9 and the upper housing 13 or between the circuit board 9 and the lower housing 14. Since the optical interface port 400 is located outside a device when in use of the optical module, there will be further electromagnetic interference to other devices.

Figure 8:
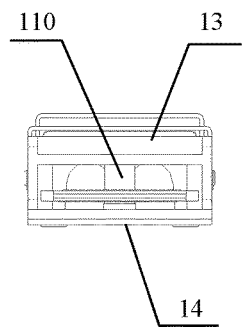
FIG. 8 is a side view of FIG. 6.
Figure 9:
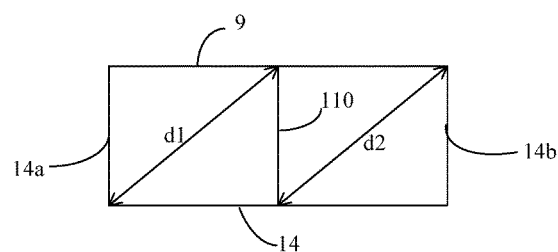
FIG. 9 is a simplified view of a circuit board and a structure beneath the circuit board in FIG. 8.
Figure 10:
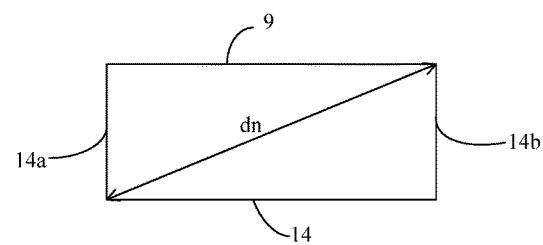
FIG. 10 is a simplified view of FIG. 9, when no conductor is arranged.

With regard to the optical module in this embodiment, the conductor 100, the upper housing 13 and the lower housing 14 are all made of metal. FIG. 8 is a view of projection from the electric interface port 100 to the optical interface port 400 in FIG. 6. FIG. 9 is a simplified view of the circuit board 9 and a structure beneath the circuit board in FIG. 8. FIG. 10 is a schematic view of FIG. 9, when no conductor is arranged. The gap between the two sides of the housing is divided into at least two parts by the conductor 110, i.e., a gap between the conductor 110 and one side 14a of the lower housing 14 as shown in FIG. 9 and a gap between the conductor 110 and the other side 14b of the lower housing 14. If there is a plurality of conductors 110, there is also a gap between adjacent conductors. Both of the maximum linear dimensions d1 and d2 of any divided gap are less than the maximum linear dimension do of the original gap. After the conductors 110 are arranged, the maximum linear dimension of the gap through which the electromagnetic radiations of the optical module pass becomes smaller, thus the strength of the electromagnetic waves passing through the hole can be weakened. In this way, the electromagnetic waves radiated by the connecting fingers can be effectively attenuated from leaking from the optical interface port via the gap between the circuit board and the housing. Wherein, the maximum linear dimension of a gap is a maximum length between any two points in a cross-section of the gap. For example, when the gap in this embodiment has a rectangular cross-section, the maximum linear dimension is the length of the diagonal of the rectangle. When the gap has a circular cross-section, the maximum linear dimension is the length of the diameter of the circle. The electromagnetic waves radiated by the connecting fingers 91 are transmitted from the divided gaps, respectively. According to the shielding effectiveness formula of the gap $Se=20\lg(\lambda/2d)$, where $\lambda$ is the wavelength of the electromagnetic waves, d is the maximum linear dimension of a gap, and Se is the shielding effectiveness, it is indicated from the formula that the shielding effectiveness Se can be increased since in this solution, the maximum linear dimension of any gap after being divided by the conductor 110 is less than the original maximum linear dimension, i.e. the maximum linear dimension d is reduced.

Taking a 10G optical module as an example, the wavelength of electromagnetic waves $\lambda$ is 30 mm ($\lambda=30$ mm). Still taking gaps between the circuit board 9 and the lower housing 14 as an example, if there is no cylindrical conductor, as shown in FIG. 9 and FIG. 10, the maximum length do of the gap between the circuit board 9 and the lower housing 14 is 16.91 mm. Before the conductor 110 is arranged, the gaps above and below the circuit board 9 have no shielding function, with a shielding effectiveness Se of 0. After the conductor 110 is arranged, the maximum length d1 of any gap between two sides is 7.87 mm, with the shielding effectiveness of the gap between the circuit board 9 and the lower housing 14 being:

$$Se=20\lg(\lambda/2d)=20\lg(30/(2*7.87))=5.60\text{DB}.$$

With the same method, the shielding effectiveness of the gaps between the circuit board 9 and the upper housing 13 after the conductor 110 is arranged can be calculated. By summating the two shielding effectiveness values, an overall shielding effectiveness can be obtained. It can be indicated that a large portion of energy can be shielded after the conductor 110 is arranged.

In order to conveniently mount the conductor 110 and reduce the length of the conductor 110, the conductor 110 can be arranged to be perpendicular to the upper housing 13 or the lower housing 14. Generally, if the upper housing 13 and the lower housing 14 are arranged in parallel, the conductor 110 is arranged to be perpendicular to both the upper housing 13 and the lower housing 14.

According to the Faraday Cage principle, as long as an enclosed structure is formed on a surface by the conductor 110 and the upper housing 13, the lower housing 14 and the sides, the electromagnetic waves can be shielded, without extending the conductor 110 in the longitudinal direction of the upper housing 13 or the lower housing 14. In order to reduce the amount of material used for the conductor 110 and make the assembly less complicated, the conductor 110 can have a cylindrical structure. For example, metal screws can be used since they are convenient to obtain and convenient to assemble.

Figure 7:
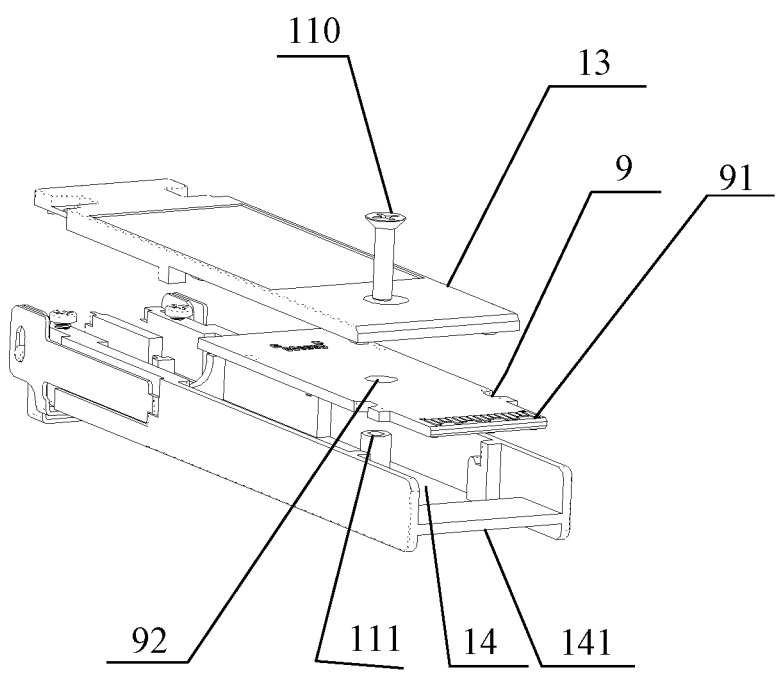
FIG. 7 is a schematic disassembly structure diagram of FIG. 6.

As shown in FIG. 7, a through hole 92 for the circuit board, provided for the conductor 110 to pass through, is formed on the circuit board 9. Since the distance between the upper housing 13 and the lower housing 14 can be obtained by measurement, the length of the conductor 110 can be set correspondingly according to the distance between the upper housing 13 and the lower housing 14. At the premise of not influencing the distribution of communication lines in the circuit board 9 and if the space permits, a plurality of conductors 110 are provided and the electromagnetic waves are thus best shielded.

With regard to the optical module of this embodiment, by weakening the strength of the electromagnetic waves from the electric interface port 100 to the optical interface port 400 by providing conductor(s) 110, the electromagnetic radiation to the outside from the optical interface port 400 is weakened. Since the electromagnetic interference is generated at the connecting fingers 91, the conductor 110 can be provided at a root portion of the connecting fingers 91. In this way, the electromagnetic interference is better shielded.

A tubular structure 111 matched with the conductor 110 is fixed on the upper surface of the lower housing 14. The tubular structure 111 can fix the conductor 110. There are external threads on the surface of the conductor 110, and there are internal threads inside the tubular structure 111. Upon passing through the through hole 92 for the circuit board 9, the conductor 110 is screwed into the tubular structure 111.

In order to better shield the electromagnetic waves, when a plurality of conductors 110 are provided, the plurality of conductors 110 are located in a same plane perpendicular to the length direction of the optical module.

The electromagnetic shielding capacity depends on the width of the maximum gap. In order to reduce the width of the maximum gap to the maximum, when there is a plurality of conductors 110, the plurality of conductors are evenly distributed between two sides of the upper housing or the lower housing. When there is one conductor 110, the conductor 110 is located in the middle between the two sides of the upper housing or the lower housing. In this case, the gaps have an equal width, and correspondingly, the maximum gap has a minimum width.

Figure 6:
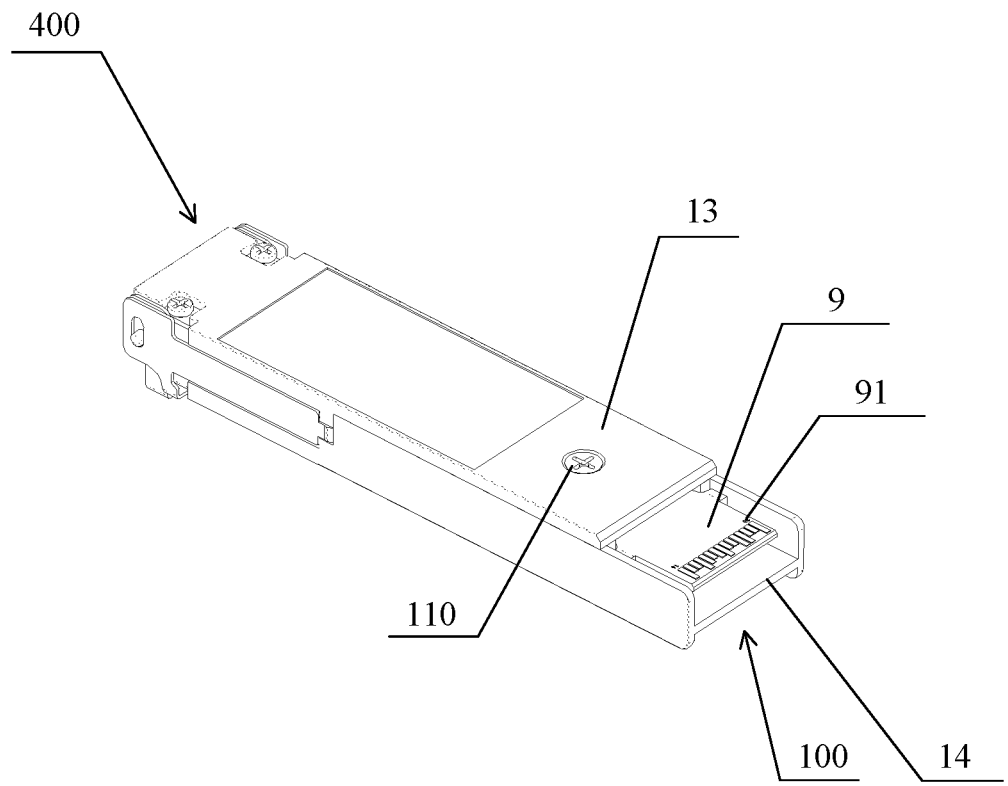
FIG. 6 is a schematic structure diagram of an optical module according to some embodiments of the present disclosure.

As shown in FIG. 6, a segment of plate-like protection wall 141 is protruded outward from the lower housing 14 with respect to the connecting fingers 91. The protection wall 141 is configured to protect the electric interface port 100 when the optical module falls accidently. In this way, damage caused when the optical module falls onto and comes into contact with the ground is prevented. Meanwhile, the protection wall 141 also has a buffering function.

With regard to the optical module of some embodiments of the present disclosure, by providing at least one conductor at an internal side of the connecting fingers, the conductor divides a gap between two sides of the upper housing or the lower housing into at least two portions. According to the principle that the smaller the diameter of the gap is, the stronger the gap can shield the electromagnetic waves, for an optical module in which the conductor is arranged, the electromagnetic waves radiated by the connecting fingers are transmitted from the gaps between the two sides of the conductor or transmitted between two adjacent conductors (when there is a plurality of conductors), thus, by reducing the maximum linear dimension of the original gap, the strength of the electromagnetic waves passing through the hole can be weakened. The more the conductors are, the smaller the maximum linear dimension of the gap transmitting the electromagnetic waves is, and correspondingly, the capacity of shielding electromagnetic waves is stronger. In this way, the electromagnetic waves radiated by the connecting fingers can be effectively attenuated from leaking from the optical interface port via the gap between the circuit board and the housing.

The foregoing descriptions are merely some embodiments of the present disclosure. However, the protection scope of the present disclosure is not limited thereto. Any changes or replacements made by those skilled in the art within the technical scope disclosed by the present disclosure should fall into the protection scope of the present disclosure. Therefore, the protection scope of the present disclosure shall be subject to the protection scope of the claims.

What is claimed is:

1. An optical module, comprising a housing, an adaptor and an optical sub-module being provided inside the housing, the adapter being fixed with the optical sub-module, wherein an optical port component is also provided inside the housing, the optical port component is located at one side of the adaptor far away from the optical sub-module, and an opening is formed at one end of the optical port component far away from the adaptor; and
   a through hole for the optical port component is formed on an end surface of the optical port component close to the adaptor, the adaptor can pass through the through hole for the optical port component to be fixed with the optical port component, and an optical fiber can be inserted into the adaptor from the opening,
   wherein a first limiting protrusion and a second limiting protrusion are sleeved on the adaptor, both of the first limiting protrusion and the second limiting protrusion are fixed with the adaptor, and a groove is formed between the first limiting protrusion and the second limiting protrusion,
   a connecting, member is sleeved on the adaptor, and the connecting member is clamped in the groove, and
   when the adaptor passes through the through hole for port component, the connecting member is fixed with the optical port component.

2. The optical module according to claim 1, wherein the optical port component is detachably connected to the housing.

3. The optical module according to claim 2, wherein a first groove is provided on a bottom surface of the optical port component, a third limiting protrusion is provided on a bottom surface of the housing, and the first groove matches with the third limiting protrusion;
   a second groove is provided at one end in the bottom surface of the optical port component far away from the adaptor, a fourth limiting protrusion is provided on the bottom surface of the housing, and the fourth limiting protrusion is damped inside the second groove.

4. The optical module according to claim 1, wherein the connecting member comprises a base plate with hole and side plates fixed at the edges of the base plate with hole;
   the adaptor comprises a first segment on which the first limiting protrusion is arranged and a second segment on which the second limiting protrusion is arranged, the first segment is fixed with the optical sub-module, and the first segment is connected to the second segment so that the groove is formed between the first limiting protrusion and the second limiting protrusion; the base plate with hole is clamped in the groove; and the second segment can pass through the through hole for the optical port component; and
   when the second segment passes through the through hole for the optical port component, the side plates of the connecting member are fixed with the side surfaces of the optical port component.

5. The optical module according to claim 4, wherein the side plates of the connecting member are fixed with the side surfaces of the optical port component by gluing.

6. The optical module according to claim 4, wherein the base plate with hole of the connecting member has a same size as that of an end surface of the optical port component close to the adaptor.

7. The optical module according to claim 1, wherein the housing comprises a plate-like upper housing and a U-shaped lower housing; and
   the upper housing can cover the lower housing.

8. The optical module according to claim 1, wherein the optical sub-module is a cuboid or a prism.

9. The optical module according to claim 1, wherein the connecting member is made of metal.

10. The optical module according to claim 1, wherein the housing comprises an upper housing and a lower housing; a circuit board located at one side of the optical sub-module far away from the adaptor and electrically connected to the optical sub-module is also provided inside the housing; connecting fingers are provided on the circuit board to form an electric interface port; and at least one conductor is provided between the optical port component and the electric interface port, and the conductor extends from the upper housing to the lower housing.

11. The optical module according to claim 10, wherein the circuit board is provided with a through hole for the circuit board, and the conductor passes through the through hole for the circuit board and extends downward to the lower housing.

12. The optical module according to claim 11, wherein a tubular structure matched with the conductor is fixed on an upper surface of the lower housing; there are external threads on the surface of the conductor; there are internal threads inside the tubular structure; and upon passing the conductor through the through hole for the circuit board, the conductor is screwed into the tubular structure.

13. The optical module according to claim 10, wherein the conductor is set to be perpendicular to the upper housing and/or the lower housing.

14. The optical module according to claim 13, wherein the conductor has a cylindrical structure.

15. The optical module according to claim 14, wherein there is a plurality of conductors, and the plurality of conductors are located in a same plane perpendicular to a length direction of the optical module.

16. The optical module according to claim 15, wherein the plurality of conductors are evenly arranged between two sides of the upper housing or the lower housing.

17. The optical module according to claim 14, wherein there is one conductor, and the conductor is located in the middle of a space between the two sides of the upper housing or the lower housing.

18. The optical module according to claim 10, wherein a segment of plate-like protection wall is protruded outward from the lower housing with respect to the connecting fingers.

* * * * *